(12) United States Patent
Kleinschmidt et al.

(10) Patent No.: US 9,317,840 B2
(45) Date of Patent: Apr. 19, 2016

(54) REMOTE SERVICE EVALUATION AND RECOMMENDATION

(75) Inventors: Uwe Kleinschmidt, Santa Barbara, CA (US); Svatjoslav Rilov, Lynnwood, WA (US); Ute Gerlach, Stuttgart (DE)

(73) Assignee: AutoVitals, Inc., Santa Barbara, CA (US)

( * ) Notice: Subject to any disclaimer, the term of this patent is extended or adjusted under 35 U.S.C. 154(b) by 512 days.

(21) Appl. No.: 13/544,818

(22) Filed: Jul. 9, 2012

(65) Prior Publication Data

US 2014/0012460 A1    Jan. 9, 2014

(51) Int. Cl.
*G06F 19/00* (2011.01)
*G06Q 10/00* (2012.01)
*G07C 5/00* (2006.01)

(52) U.S. Cl.
CPC . *G06Q 10/20* (2013.01); *G07C 5/00* (2013.01)

(58) Field of Classification Search
CPC ........ G07C 5/008; G07C 5/0808; G07C 5/85; G06Q 10/06; Y10S 707/99932; Y10S 707/99933; Y10S 707/99934; Y10S 707/99935; Y10S 707/99945
USPC ....................................................... 701/31.5
See application file for complete search history.

(56) References Cited

U.S. PATENT DOCUMENTS

| | | | |
|---|---|---|---|
| 6,611,740 B2 | 8/2003 | Lowrey et al. | |
| 6,735,503 B2 | 5/2004 | Ames | |
| 6,933,842 B2 | 8/2005 | Oesterling et al. | |
| 7,092,937 B2 | 8/2006 | Morgan et al. | |
| 7,729,824 B2 | 6/2010 | Tolkacz | |
| 7,747,365 B1* | 6/2010 | Lowrey et al. | 701/31.4 |
| 7,920,944 B2 | 4/2011 | Gould et al. | |
| 2002/0016655 A1* | 2/2002 | Joao | 701/35 |
| 2004/0148188 A1 | 7/2004 | Uegak | |
| 2007/0093947 A1* | 4/2007 | Gould et al. | 701/29 |
| 2009/0113317 A1 | 4/2009 | Summers et al. | |
| 2009/0222416 A1 | 9/2009 | Tymoshenko et al. | |
| 2010/0125852 A1 | 5/2010 | Grant et al. | |
| 2010/0235411 A1 | 9/2010 | Bray | |
| 2013/0338873 A1* | 12/2013 | Baalu | 701/31.4 |

* cited by examiner

*Primary Examiner* — Helal A Algahaim
*Assistant Examiner* — Charles J Han
(74) *Attorney, Agent, or Firm* — SoCal IP Law Group LLP; Jonathan Pearce; Steven C. Sereboff

(57) ABSTRACT

There is disclosed a method and apparatus for remote service evaluation and recommendation. The method includes obtaining owner authorization to access diagnostic data associated with an automobile for a trusted, owner-designated repair technician with whom the owner has a preexisting relationship and obtaining diagnostic data for the automobile. The method further includes transmitting, via a network connection, the diagnostic data to the owner-designated repair technician at a location remote from the automobile and receiving, via the network connection, a recommendation from the owner-designated repair technician based upon the diagnostic data, the recommendation including a recommended service and a time for completing the recommended service.

17 Claims, 5 Drawing Sheets

REMOTE SERVICE EVALUATION AND RECOMMENDATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to remote service evaluation and recommendation.

2. Description of the Related Art

Automobiles develop problems, require monitoring or real-time tracking while they are in-use, for example, by an automobile owner. These problems may be apparent to the automobile owner, for example, the automobile may begin functioning poorly, cease functioning or make unusual sounds. Further, most modern automobiles are equipped with computerized diagnostic systems that warn the automobile owner of problems via warning lights or other notification systems.

Automobile owners in turn often have trusted repair technicians who assist with automobile repairs for their vehicles. Relationships between trusted repair technicians and automobile owners develop over time. These relationships may be with an individual mechanic or with a particular business. The owner may know the repair technician personally. The repair technician may have worked on the owner's automobile a number of times in the past and be quite familiar with its individual quirks.

However, as issues with the automobile arise, the owner may have limited capability, even in view of the modern computerized diagnostic systems, to determine whether a particular problem is trivial, somewhat important, very important or critical. Taking the automobile to a repair technician is an option, but wastes time better used only in cases of critical problems. Further, the automobile may be distant from a trusted repair technician and the driver may not know of a suitable, local repair technician. Even when there are problems, many may be addressed, for example, at the next regularly scheduled maintenance.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
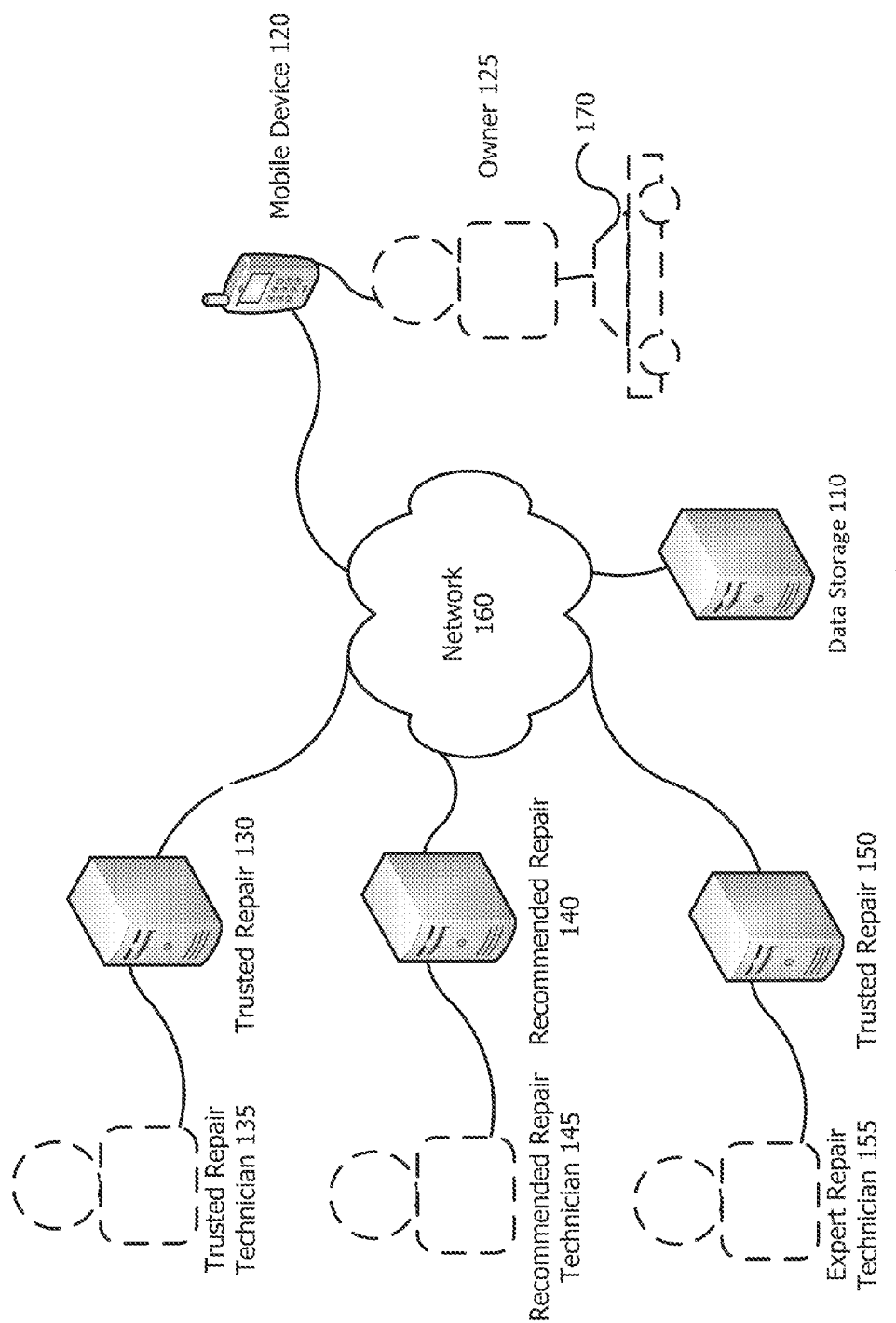
FIG. 1 is a block diagram of an environment for remote service evaluation and recommendation.

Referring now to FIG. 1, there is shown an environment 100 for remote service evaluation and recommendation. The environment 100 includes data storage 110, a mobile device 120 associated with an owner 125 of an automobile 170, a trusted repair system 130 associated with a trusted repair technician 135, a recommended repair system 140 associated with a recommended repair technician 145, an expert repair system 150 associated with an expert repair technician 155 all interconnected via a network 160.

The data storage 110 is a computing device running database software suitable for storing automobile diagnostic data generated by automobiles like automobile 160. The data storage 110 may be one or more computing devices operating in concert and may be distributed on the network 150. The data storage 110 may be a separate server, for example, available via the Internet. Alternatively, the data storage 110 may be a part of the trusted repair system 130 or the mobile device 120.

The mobile device 120 is a computing device including software suitable for obtaining diagnostic data generated by the automobile 160. The mobile device 120 is associated with the owner 125 and is capable of interfacing with the automobile 160 to obtain diagnostic data. The mobile device may be, for example, a mobile phone connected running software suitable for interfacing with computer diagnostic systems of the automobile 160. The mobile device 120 may, alternatively, be a stand-alone device, a tablet pc, a notebook or netbook, or may be built directly into the computerized diagnostic systems of the automobile.

The trusted repair system 130 is a computing device running software suitable for use by the trusted repair technician 135 to access the data storage 110 in order to view the diagnostic data. Alternatively, the trusted repair system 130 may receive diagnostic evaluations sent by the data storage 110. The trusted repair system 130 may parse the diagnostic data before it is viewed by the trusted repair technician 135.

The trusted repair technician 135 as used herein is an individual or group with whom the owner of an automobile has a preexisting relationship and whom the owner has designated as a recipient of diagnostic data generated by the owner's automobile so that the trusted repair technician may make recommendations based upon the diagnostic data. This designation may take the form of the owner identifying the trusted repair technician 135 or granting the trusted repair technician 135 access to the owner's automobile diagnostic data using a mobile device, such as mobile device 120, or a website.

The trusted repair technician 135 is discussed herein as though he or she were an individual. However, it is to be understood that the trusted repair technician 135 may be a particular repair shop or service company with whom the owner of an automobile has a preexisting relationship.

A "recommendation" is an evaluation of the diagnostic data generated by the automobile 160 and provided by the owner 125 to the trusted repair technician 135 via the trusted repair system 130 for review. The recommendation identifies the type of problem, the problem's severity, a recommended service and a recommended timing of the service. The recommendation may also include the identity of a local repair technician or an estimated cost of the recommended service. The recommendation is provided via email, text message, multimedia message, or as a part of a recommendation web page to an owner. For example, the recommendation may be provided to an owner via the owner's mobile device 120.

The recommended repair system 140 is a computing device running software suitable for use by the recommended repair technician 145 to access the data storage 110 in order to view diagnostic data. As with the trusted repair system 130, the recommended repair system 140 may receive diagnostic data sent by the data storage 110. The recommended repair system 140 may parse the diagnostic data before it is viewed by the recommended repair technician 145.

The recommended repair technician 145 as used herein is a repair technician, identified by the trusted repair technician 135, for performing the recommended service identified by the trusted repair technician 135 in the recommendation. The recommended repair technician 145 is identified because a repair is determined by the trusted repair technician 135 to be urgently-needed and further because the owner 125 and automobile 160 are in a location distant from the trusted repair technician 135. Alternatively, the trusted repair technician 135 may identify a recommended repair technician 145 if the recommended repair technician 145 possesses specialized skills or equipment necessary for a recommended service. The recommended repair technician 145 is described herein as an individual, but like the trusted repair technician 135, the recommended repair technician 145 may be a repair shop or chain of repair shops.

The expert repair system 150 may be used by the expert repair technician 155 in the same way that the trusted repair system 130 is used by the trusted repair technician 135. The expert repair system 150 provides a way for the trusted repair technician 135 to share diagnostic data and obtain expert advice from the expert repair technician 155.

The network 160 interconnects each of the data storage 110, the mobile device 120, the trusted repair system 130 and the recommended repair system 140. The network 160 may be or include the Internet, a mobile telephony network, wireless or wired wide area or local area networks and short range wireless protocols such as Bluetooth® or infrared.

Figure 2:
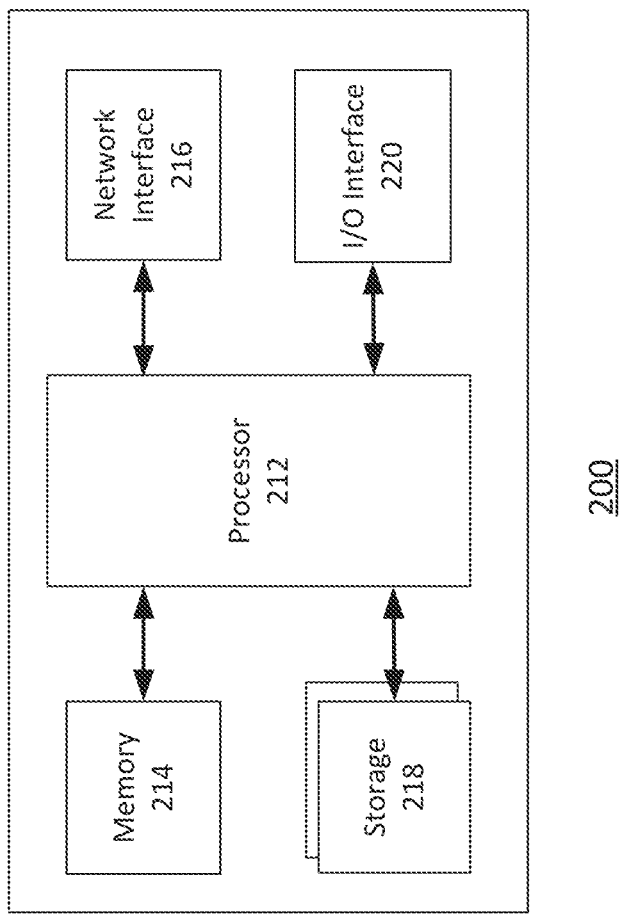
FIG. 2 is a block diagram of a computing device.

Turning now to FIG. 2 there is shown a block diagram of a computing device 200, which is representative of the trusted repair system 130 in FIG. 1, the recommended repair system 140 in FIG. 1, mobile device 120 and data storage 110. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 212 coupled to a memory 214, storage 218, a network interface 216 and an I/O interface 220. The processor 212 may be or include one or more microprocessors, field programmable gate arrays (FPGAs), application specific integrated circuits (ASICs), programmable logic devices (PLDs) and programmable logic arrays (PLAs).

The memory 214 may be or include RAM, ROM, DRAM, SRAM and MRAM, and may include firmware, such as static data or fixed instructions, BIOS, system functions, configuration data, and other routines used during the operation of the computing device 200 and processor 212. The memory 214 also provides a storage area for data and instructions associated with applications and data handled by the processor 212.

The storage 218 provides non-volatile, bulk or long term storage of data or instructions in the computing device 200. The storage 218 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 218 and does not include transitory media such as signals or waveforms. In some cases, such as those involving solid state memory devices, the memory 214 and storage 218 may be a single device.

The network interface 216 includes an interface to a network such as network 150 (FIG. 1).

The I/O interface 220 interfaces the processor 212 to peripherals (not shown) such as displays, keyboards and USB devices.

Figure 3:
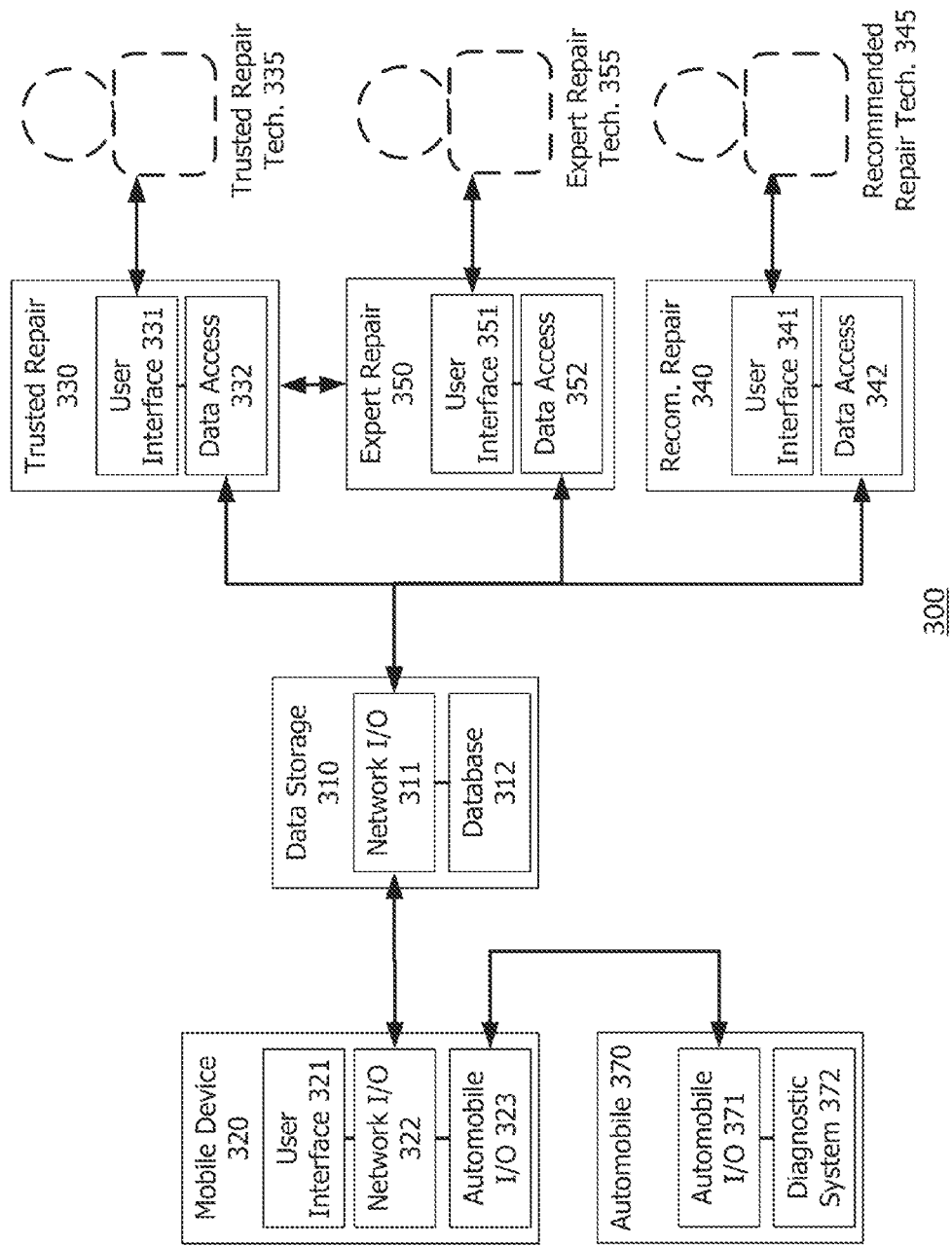
FIG. 3 is a block diagram of a system for remote service evaluation and recommendation.

Turning now to FIG. 3, there is shown a block diagram of a system 300 for remote service evaluation and recommendation. The system 300 comprises a data storage 310, a mobile device 320, a trusted repair system 330, a trusted repair technician 335, a recommended repair system 340, a recommended repair technician 345, an expert repair system 350, an expert repair technician 355 and an automobile 370. The data storage 310, mobile device 320, trusted repair system 330, recommended repair system 340 and automobile 370 may be the data storage 110, mobile device 120, trusted repair system 130, recommended repair system 140 and automobile 160 of FIG. 1.

The data storage 310 includes a network input/output interface 311 and a database 312. The network input/output interface 311 is used to communicate with the mobile device 320. The database 312 is used to store automobile diagnostic data generated by the automobile 370 and received via the network input/output interface 311.

In some instances, the data storage 310 may be integrated either directly with the mobile device 320 or the trusted repair system 330. That is, diagnostic data generated by the automobile 370 may be forwarded by the mobile device 320 to the data storage 310 that is a part of the trusted repair system 330, for example, a data storage location associated with the trusted repair system 330. Alternatively, the data storage 310 may be a part of the mobile device 320 that may be accessed by the trusted repair system 330.

In still other instances, the data storage 310 may be a web-based system, accessible by the owner or any other party with appropriate rights. Those rights may be individual or may be derivative of the owner's rights such that, for example, the owner may designate a trusted repair technician through an "opt-in" process or by forwarding the trusted repair technician appropriate login and password information.

The mobile device 320 includes a user interface 321, network input/output interface 322 and automobile input/output interface 323. The user interface 321 may be used, for example, if the mobile device 320 is a mobile telephone, by a user to interact with the mobile device 320. One such interaction may be an explicit request to provide automobile diagnostic data to data storage 310 or to otherwise provide diagnostic data to the trusted repair system 330.

The mobile device 320 also includes network input/output interface 322 that is used by the mobile device 320 to communicate, for example using the network 160 (FIG. 1) with the data storage 310 and the trusted repair system 330 or recommended repair system 340. The automobile input/output interface 323 may be used to interact with the automobile 370, particularly for receiving automobile diagnostic data from the automobile 370.

Although shown separately, the mobile device 320 may be integral to the automobile 370. Whether separate from or integral to the automobile 370, the mobile device 320 may communicate using the network 160 (FIG. 1) via the network input/output interface 322 with the network input/output interface 311. This communication may be, for example, via WiFi®, WiMAX® or mobile telephony protocols. The network input/output interface 322 is used to transmit automobile diagnostic evaluations generated by the automobile 360 to the data storage 310.

The automobile input/output interface 323 is designed to interface with the diagnostic system 362 (discussed below) of the automobile 370. This interface may be via Bluetooth®, WiFi®, WiMAX®, various mobile telephony protocols, direct access via USB®, various other wired computer interface protocols, or a proprietary wired or wireless interface. Alternatively, the diagnostic system 372 of the automobile 370 may directly incorporate the capabilities of the mobile device 320 such that the automobile input/output interface 323 is, effectively, a bus inside the combined system.

The trusted repair system 330 includes a user interface 331 and data access 332. The trusted repair system 330 may be a personal computer, tablet computer, mobile telephone or similar device suitable for use by a trusted repair technician 335 for accessing automobile diagnostic evaluations stored in the database 312.

The trusted repair system 330 is accessed by the trusted repair technician 335 via the user interface 331. The user interface 331 provides the trusted repair technician 335 access to the automobile diagnostic data stored in the database 312. The user interface 331 may be web-based or may be a part of a stand-alone application. Alternatively, user interface 331 may be email client software or a text messaging functionality.

The trusted repair system 330 may also parse the diagnostic data to thereby generate diagnostic evaluation data. The diagnostic evaluation data may include a listing of likely issues, preferably listed in descending order of likelihood, based upon the diagnostic data provided by the automobile 370 diagnostic system 372. In addition, the diagnostic evaluation data may include tests to perform on the automobile 370 in order to confirm one or more of the likely issues. The diagnostic evaluation data may also include proposed repairs or services in order to address each of the likely issues.

For example, the diagnostic data may include diagnostic trouble codes which may indicate that a particular system is failing or not operating optimally, but further analysis may be necessary to determine why the system is functioning poorly. In addition, the diagnostic data may be or include raw data generated by an automobile 370 diagnostic system 372. This raw data may be parsed by the trusted repair system 330 to further clarify the likely causes of the system failure.

The trusted repair system 330 may provided access to the diagnostic evaluation data in addition to the underlying diagnostic data so that the trusted repair technician 335 may make his or her own judgment regarding any issue. The data access 332 may be used by the trusted repair technician 335 to access the database 312 on the data storage 310. The data access 332 may be a part of a web or stand-alone application on the trusted repair system 330.

The recommended repair system 340 is similar to the trusted repair system 330. It also includes a user interface 341 and data access 342. These operate for the recommended repair system 340 in similar ways as the corresponding elements operate for the trusted repair system 330.

The expert repair system 350 is similar to the trusted repair system 330. It also includes a user interface 351 and data access 352. However, the expert repair system 350 may be used by the expert repair technician 355 to evaluate diagnostic data or diagnostic evaluation data that is shared or otherwise made accessible by the trusted repair technician 335 using the trusted repair system 330. The expert repair technician 355 may be an individual who is an expert in a particular automobile system or a particular make or model of automobile. The expert repair system 350 may be used by the expert repair technician 355 in the event that the trusted repair technician would like a second opinion or would like assistance in evaluating the automobile 370 or a particular automobile system.

The automobile 370 includes an automobile input/output interface 371 and a diagnostic system 372. The automobile input/output interface 371 is used to communicate diagnostic evaluations from the automobile 360 to the mobile device 320. As described above, the mobile device 320 may instead be integral to the automobile 370, such that the automobile input/output interface 323 and automobile input/output interface 371 communicate over a bus.

The diagnostic system 372 is made up of one or more computer systems that evaluate the current operation of the automobile 370. The diagnostic system may also be responsible for generating service warnings regarding the automobile 370 for an operator of the automobile 370.

Description of Processes

Figure 4:
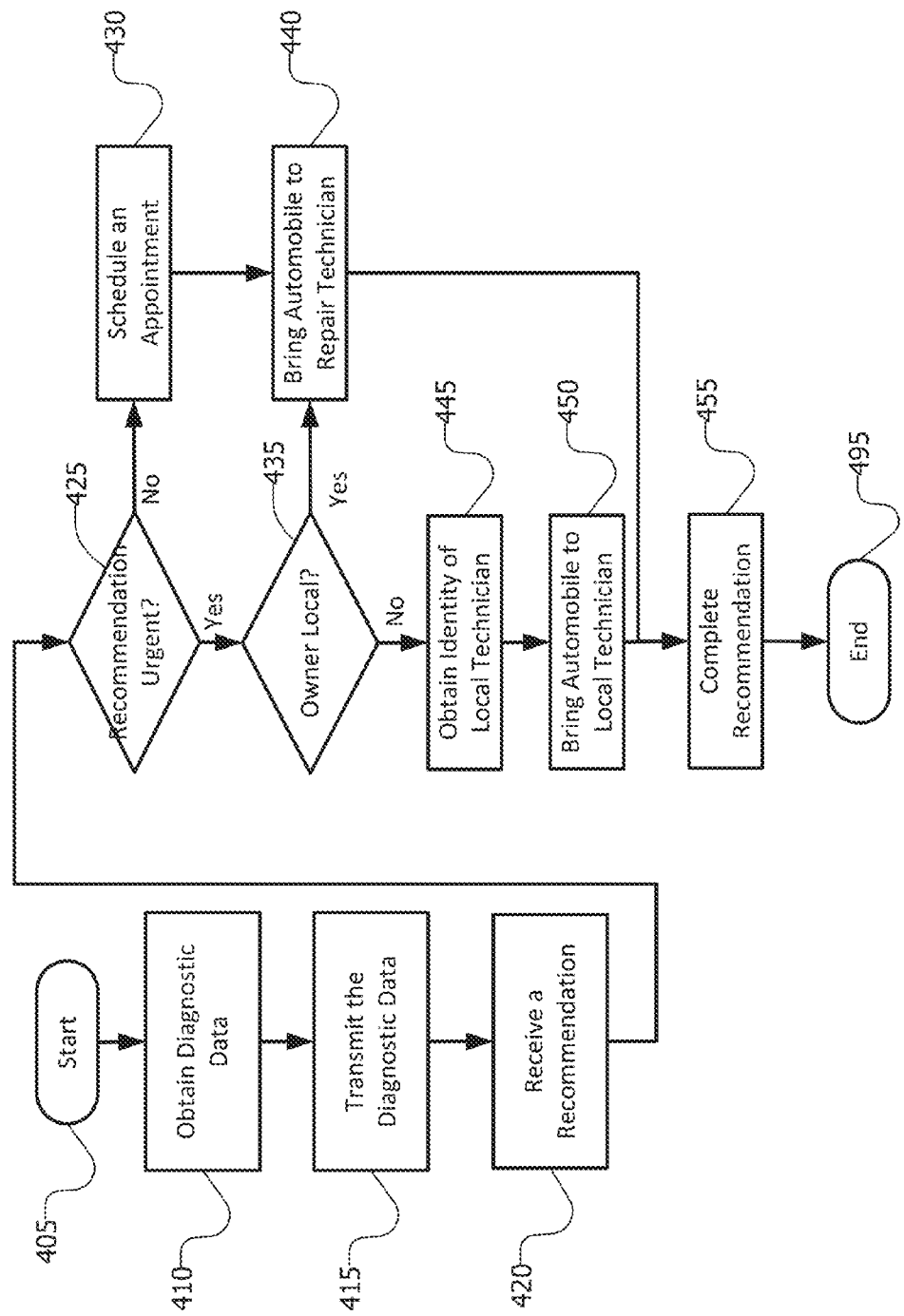
FIG. 4 is a flowchart for remote service evaluation and recommendation from an owner's perspective.

Referring now to FIG. 4, a flowchart for remote service evaluation and recommendation is shown from an owner perspective, for example owner 125 of FIG. 1. First, the owner's automobile obtains diagnostic data 410. This diagnostic data may be generated in response to an error in the automobile detected by a diagnostic system 372 (FIG. 3). The diagnostic data may be stored in the automobile diagnostic system 372 until it may be transmitted. The process of obtaining the diagnostic data 410 may also include translation or parsing of data created by the automobile diagnostic system into a human-readable or database-ready form.

Next, the diagnostic data is transmitted 415 to a trusted repair technician via a data storage system. At this stage, the automobile-generated diagnostic data is sent to the trusted repair technician for review. The trusted repair technician can review the diagnostic data and determine whether the problem or problems identified by the diagnostic evaluation represent critical, very important, somewhat important or minor problems. As described above, the diagnostic data may be further parsed into diagnostic evaluation data by the trusted repair system 330 (FIG. 3). The trusted repair technician may then provide a recommendation in view of the severity of the problem.

The recommendation is received by the mobile device (or automobile) 420. Critical services may require immediate attention, but less-critical services may only require attention at the next available opportunity or at the next regularly-scheduled maintenance. The recommendation will take the severity of problems into account.

A determination is made whether the recommendation provided by the trusted repair technician is urgent, requiring immediate attention 425. If not, an appointment with the trusted repair technician may be scheduled 430. This appointment may be scheduled via the mobile device or manually by the owner of the automobile.

If the recommendation is urgent, then a determination is made whether the owner is local to the trusted repair technician 435. Because this system utilizes a mobile device to provide the diagnostic evaluation to the trusted repair technician and in order to receive the recommendation, the owner may be distant from the trusted repair technician when a recommendation is made. If this is not the case, the owner is local to the trusted repair technician and the repair is urgent, then the owner brings the automobile to the trusted repair technician 440.

If the owner is not local, the trusted repair technician may provide and the owner may obtain the identity of a local repair technician 445. In particular, the trusted repair technician may provide, as a part of his or her recommendation to the owner the identity of one or more local repair technicians that may then be provided to the owner. The local repair technician may provide the recommended service to the owner in place of the trusted repair technician.

If the local repair technician is to be used, then the owner brings the automobile to the local technician 450. Once either the local or the trusted repair technician has the automobile, for either the urgently-needed repair or routine service, the recommendation may be completed 455. In the case of the local repair technician, he or she may be provided the recommendation from the trusted repair technician in order to prepare for the service, for example, a service history of the automobile and information pertaining to the needed parts may be provided as a part of the recommendation. In the case of the trusted repair technician, he or she will already know the issue with the automobile before it is brought in for the service.

In either case, if urgent service is not needed, he or she may have the opportunity to order needed parts or materials based upon the recommendation provided. For example, if the diagnostic evaluation from the automobile indicated that insufficient vacuum is being detected by the diagnostic systems in the manifold, this may indicate that the intake manifold gasket is leaking. This is not an urgent repair, so the repair technician may order the appropriate intake manifold gasket and have it on hand at the time of the automobile's next service.

Figure 5:
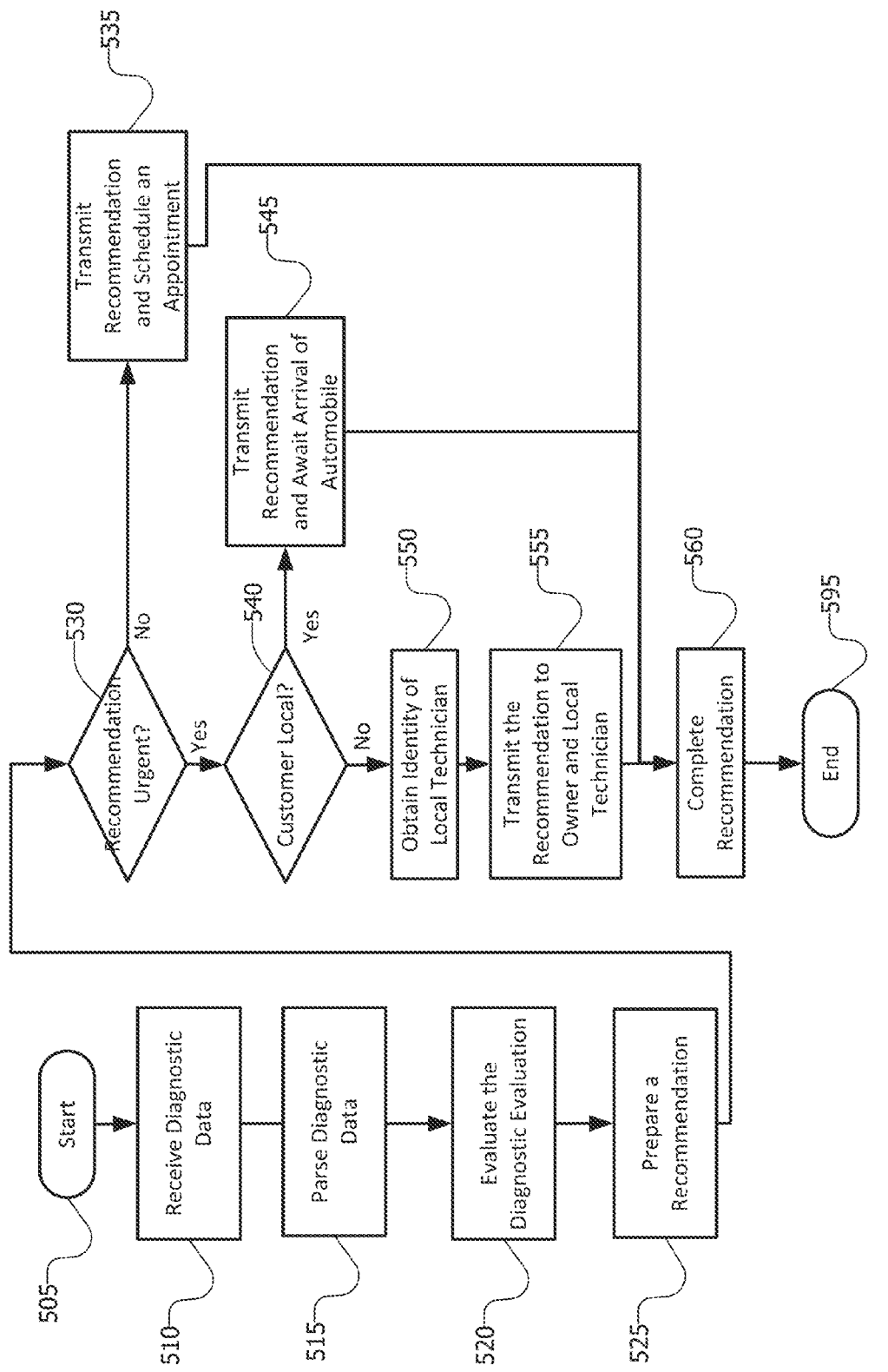
FIG. 5 is a flowchart for remote service evaluation and recommendation from a repair technician's perspective.

Turning now to FIG. 5, a flowchart for remote service evaluation and recommendation from a repair technician perspective, for example trusted repair technician 335 in FIG. 3. The trusted repair technician first receives diagnostic data 510. This may be received via email, text message, as a notification after a login into a system for reviewing diagnostic evaluations or by similar processes. Part or all of the diagnostic data may have been or may be parsed or translated from the automobile-created format into a format more suitable for evaluation by the trusted repair system 330 or review by the trusted repair technician 335 (FIG. 3).

Once received, the diagnostic data is parsed 515. This step may involve review of raw data provided as diagnostic data by the automobile. This raw data may be used in conjunction with a database of potential problems with an automobile to generate a listing of likely problems. This listing may be in order of descending likelihood. For example, the same raw data may indicate a leak in the exhaust system, but may not precisely indicate where. The system may propose, based upon the data, that the exhaust manifold is leaking, but may also suggest that the catalytic converter may also be leaking.

For each likely problem identified in the listing, a test or tests to determine whether the issue is relevant may also be included as a result of the parsing. Returning to the example above, the repair technician may be asked to listen for exhaust escaping in the engine compartment and, if not found, then may listen for or look for exhaust stains on the exterior of the catalytic converter.

This series of tests and/or likely problems may be evaluated using a diagnostic decision tree. That is, a series of if/then statements may be tested, based upon the diagnostic data and/or interaction with the owner, and, once the diagnostic decision tree is spanned, the most likely result will have been found. A series of statements may be used to determine issues that are irrelevant. For example, if the diagnostic data indicates that an automobile has an exhaust system leak, the portions of the diagnostic decision tree pertaining to anything but exhaust systems, such as tires, air conditioning systems, coolant systems and fuel systems may be ignored. Once it is further determined that the manifold is not leaking, then it may be eliminated and the remainder of the exhaust system may be checked. This diagnostic decision tree may lead a repair technician to the most likely problem, based upon the available diagnostic data, without requiring direct, personal inspection of the automobile.

Finally, one or more proposed solutions to each of the potential problems may be provided. Returning again to the example above, replacement of the exhaust manifold, catalytic converter or the seals associated with either may be suggested, depending on the results of the tests. All of this type of information may be provided as a diagnostic evaluation to the trusted repair technician 335.

Next, the repair technician reviews the diagnostic evaluation in order to determine the severity of the associated problem or problems and to make a recommendation 520. The repair technician may also directly consider the underlying diagnostic data. This process may draw upon the trusted repair technician's expertise in order to determine the most likely cause of the problem associated with the diagnostic evaluation. For example, the diagnostic evaluation may indicate that the right, front tire has lost air pressure and, further, that it has lost air pressure several times in the last several weeks. This may indicate to the trusted repair technician that the tire is punctured. However, given that the tire is still holding air sufficiently for a few days at a time, the repair is one that should be completed soon, but is not critical enough for urgent attention.

Next, the trusted repair technician may prepare the recommendation 525. The recommendation made by the trusted repair technician may suggest that the automobile has a punctured tire, that this is not an urgently-needed repair, but that it should be address in the near future. It may further suggest that owner bring the automobile in at the next available opportunity, provide an estimate of the cost to repair or replace the tire. If the diagnostic evaluation or the mobile device indicates that the owner is distant from the trusted repair technician, the recommendation may also include the identity, such as name, address, email address and phone number of one or more local repair technicians.

As described above, if the repair is not urgent 530, the recommendation may be transmitted an appointment may be scheduled for the service 535. The schedule request may be made along with the recommendation. This process may use the mobile device 320 and trusted repair system 330 (FIG. 3). In this way, the appointment may be scheduled 535. The diagnostic evaluation and associated recommendation may be saved in a manner associated with the scheduled appointment so that the trusted repair technician may prepare for the appointment, for example, by ordering parts or materials.

If the recommendation is urgent 530, then a determination is made as to whether the owner is local 540. If the owner is local, that is, near enough to the trusted repair technician that it is practical for the owner to bring the automobile to the trusted repair technician, for example, if the owner is within 30 or 100 miles of the trusted repair technician, then the recommendation is transmitted to the trusted repair technician, via the mobile device, and the trusted repair technician awaits the owner's automobile 545.

If the owner is not local 540, then the identity of a local repair technician is obtained 550. This local repair technician may be personally known to the trusted repair technician or may be a member of a group with whom the trusted repair technician is associated. Further, the trusted repair technician may provide pricing or cost estimates as a part of the recommendation that the local repair technician is suggested or obligated, contractually or otherwise, to follow in servicing the owner's automobile. Such a group may be called a trusted referral group who are trusted by one another and refer work to one another. For example, a particular trusted repair technician and local repair technician may both be members of a group of independent mechanics specializing in repairing a particular make of automobile.

Once a local repair technician is identified, the recommendation is transmitted to the owner and the local repair technician 555. The owner then knows the identity of the local repair technician and the local repair technician knows the identity of the owner. Information available to the trusted repair technician may be provided along with the recommendation. This information may include repair histories of the automobile, billing information associated with the owner, the problems discovered as a part of the diagnostic evaluation and the associated recommendations in addition to the cost estimate and proposed solutions.

Finally, no matter whether the repair is urgent or not or whether the repair is local or remote, the recommendation may be completed 560. At this point, the recommendation is completed by the local repair technician or the trusted repair technician, ether by appointment or urgently, as-needed. The recommendation provided to the owner enabled the owner to make an informed decision about the severity, scope and urgency of the problem with the automobile all while relying upon the trusted repair technician.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for remote service evaluation and recommendation comprising:
    obtaining owner authorization to access diagnostic data associated with an automobile for a trusted, owner-designated repair technician with whom the owner has a preexisting relationship and who has performed repairs on the automobile in the past;
    using a mobile device to obtain diagnostic data for the automobile from an automobile interface designed to provide diagnostic data;
    transmitting, via a network connection, the diagnostic data to the owner-designated repair technician at a location remote from the automobile;
    receiving, via the network, a recommendation from the owner-designated repair technician based upon the diagnostic data, the recommendation including a recommended service and a time for completing the recommended service; and
    scheduling an immediate repair with a local repair technician identified by the owner-designated repair technician at a cost based upon a cost estimate provided by the owner-designated repair technician when the owner-designated repair technician recommends the recommended service be completed as soon as possible and further when the automobile is not local to the owner-designated repair technician.

2. The method of claim 1 wherein, when the owner is not local to the owner-designated repair technician, the recommendation further includes an address for the local repair technician recommended by the owner-designated repair technician to complete the recommended service.

3. The method of claim 2 wherein the local repair technician and the owner-designated repair technician are both members of a trusted referral group.

4. The method of claim 1 wherein the diagnostic data is generated as an output from a service warning system associated with the automobile.

5. The method of claim 1 further comprising transmitting, via the network connection, the diagnostic data to the local repair technician in anticipation of the recommended service.

6. The method of claim 5 further comprising transmitting the recommendation to the local repair technician in anticipation of the recommended service.

7. An apparatus comprising a storage medium storing a program having instructions which when executed by a processor will cause the processor to:
    obtain owner authorization to access diagnostic data associated with an automobile for a trusted, owner-designated repair technician with whom the owner has a preexisting relationship and who has performed repairs on the automobile in the past;
    obtain a diagnostic data using a mobile device, the diagnostic data for the automobile obtained using an automobile interface designed to provide diagnostic data;
    transmit, via a network connection, the diagnostic data to the owner-designated repair technician at a location remote from the automobile;
    receive, via the network connection, a recommendation from the owner-designated repair technician based upon the diagnostic data, the recommendation including a recommended service and a time for completing the recommended service; and
    schedule an immediate repair with a local repair technician identified by the owner-designated repair technician at a cost based upon a cost estimate provided by the owner-designated repair technician when the owner-designated repair technician recommends the recommended service be completed as soon as possible and further when the automobile is not local to the owner-designated repair technician.

8. The apparatus of claim 7 wherein, when the owner is not local to the owner-designated repair technician, the recommendation further includes address for the local repair technician recommended by the owner-designated repair technician to complete the recommended service.

9. The apparatus of claim 8 wherein the local repair technician and the owner-designated repair technician are both members of a trusted referral group.

10. The apparatus of claim 7 wherein the diagnostic data is generated as an output from a service warning system associated with the automobile.

11. The apparatus of claim 7 wherein the instructions will further cause the processor to transmit, via the network connection, the diagnostic data to the local repair technician in anticipation of the recommended service.

12. The apparatus of claim 11 wherein the instructions will further cause the processor to transmit, via the network connection, the recommendation to the local repair technician in anticipation of the recommended service.

13. The apparatus of claim 7 further comprising:

the processor;

a memory;

wherein the processor and the memory comprise circuits and software for performing the instructions on the storage medium.

14. Apparatus comprising a storage medium storing a program having instructions which when executed by a processor will cause the processor to:

obtain owner authorization to access diagnostic data associated with an automobile for a trusted, owner-designated repair technician with whom the owner has a pre-existing relationship and who has performed repairs on the automobile in the past;

obtain diagnostic data from a mobile device, the diagnostic data for the automobile obtained using an automobile interface designed to provide diagnostic data;

receive, via a network connection and at a computing device associated with the owner-designated repair technician, a diagnostic data for an automobile associated with the owner;

obtain a diagnostic evaluation for the automobile based upon the diagnostic data;

transmit, via the network connection, a recommendation from the owner-designated repair technician based upon the diagnostic evaluation, the recommendation including a recommended service and a time for completing the recommended service; and schedule an immediate repair with a local repair technician identified by the owner-designated repair technician using a user interface on a mobile device, the repair to be undertaken at a cost based upon a cost estimate provided by the owner-designated repair technician when the owner-designated repair technician recommends the recommended service be completed as soon as possible and further when the automobile is not local to the owner-designated repair technician.

15. The apparatus of claim 14 wherein the instructions will further cause the processor to transmit, via the network connection, the diagnostic evaluation and the recommendation to the local repair technician in anticipation of the recommended service.

16. The apparatus of claim 14 wherein, when the owner is not local to the owner-designated repair technician, the recommendation further includes an address for the local repair technician recommended by the owner-designated repair technician to complete the recommended service.

17. The apparatus of claim 14 further comprising:

the processor;

a memory;

wherein the processor and the memory comprise circuits and software for performing the instructions on the storage medium.

\* \* \* \* \*